US009683895B2

(12) United States Patent
Miller

(10) Patent No.: US 9,683,895 B2
(45) Date of Patent: Jun. 20, 2017

(54) NON-CONTACT INFRARED TEMPERATURE SENSOR WITH WIRELESS FUNCTIONALITY

(71) Applicants: Bosch Automotive Service Solutions Inc., Warren, MI (US); Robert Bosch GmbH, Stuttgart (DE)

(72) Inventor: Joshua Miller, Portage, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/979,290

(22) Filed: Dec. 22, 2015

(65) Prior Publication Data

US 2016/0187202 A1  Jun. 30, 2016

Related U.S. Application Data

(60) Provisional application No. 62/097,517, filed on Dec. 29, 2014.

(51) Int. Cl.
*G01J 5/00* (2006.01)
*G01J 5/10* (2006.01)
(Continued)

(52) U.S. Cl.
CPC ............... *G01J 5/10* (2013.01); *G01J 5/0003* (2013.01); *G01J 5/025* (2013.01); *G01J 5/0215* (2013.01);
(Continued)

(58) Field of Classification Search
CPC ................... G01J 5/0003; G01J 5/06
See application file for complete search history.

(56) References Cited

U.S. PATENT DOCUMENTS 6,367,972 B1 * 4/2002 Kamiyama ............... G01J 5/06
327/512
8,847,754 B2   9/2014 Buchheim et al.
(Continued)

FOREIGN PATENT DOCUMENTS

SE           2533090 A * 6/2016 .......... B61L 15/0081

OTHER PUBLICATIONS

Omega, "Non-Contact Infrared Temperature Sensor with Wireless Transmitter", http://www.omega.com/pptst/uwir-2.html, last accessed/published at least as early as Dec. 21, 2015 (2 pages).
(Continued)

*Primary Examiner* — Kiho Kim
(74) *Attorney, Agent, or Firm* — Maginot Moore & Beck LLP

(57) ABSTRACT

An infrared (IR) temperature sensor includes a detector element, a wireless communication element, a memory, and a processor. The detector element detects IR radiation emitted from an object and generates an electrical signal proportional to the detected IR radiation. The memory is configured to store command instructions. The processor is operably connected to the detector element, the wireless communication element, and the memory. The processor is configured to execute the command instructions to transform the electrical signal into an output signal proportional to a temperature of the object and transmit the output signal with the wireless communication element. The IR sensor further includes a body that encloses the detector element, the wireless communication element, the memory, and the processor. The body defines an aperture that extends between the detector element and a mounting surface of the body and faces the object.

19 Claims, 4 Drawing Sheets

(51) Int. Cl.
G08C 17/02 (2006.01)
G01J 5/04 (2006.01)
G01M 17/013 (2006.01)
G01J 5/02 (2006.01)

(52) U.S. Cl.
CPC ............... *G01J 5/0265* (2013.01); *G01J 5/04* (2013.01); *G01M 17/013* (2013.01); *G08C 17/02* (2013.01)

(56) References Cited

U.S. PATENT DOCUMENTS

| | | | | |
|---|---|---|---|---|
| 2006/0266948 A1* | 11/2006 | Hofstetter | ............... | G01T 1/161 250/370.01 |
| 2011/0178758 A1* | 7/2011 | Atwell | ................... | G01B 5/012 702/134 |

OTHER PUBLICATIONS

StickNFind, "StickNFind", https://www.sticknfind.com/sticknfind.aspx, last accessed/published at least as early as Dec. 21, 2015 (2 pages).

* cited by examiner

NON-CONTACT INFRARED TEMPERATURE SENSOR WITH WIRELESS FUNCTIONALITY

This application claims the benefit of U.S. Provisional Application No. 62/097,517, filed Dec. 29, 2014, the disclosure of which is incorporated herein by reference in its entirety.

TECHNICAL FIELD

The disclosure relates to sensor devices and more particularly to wireless temperature sensors for remote diagnostics.

BACKGROUND

Advances in technology have led to the continued miniaturization and increased portability of electronic sensor devices for various applications. One product that has benefited from such technological advances includes non-contact infrared temperature sensors. A typical non-contact infrared (IR) temperature sensor includes an IR sensor head with at least one detector element capable of receiving IR radiation emitted from an object and generating an electrical signal proportional to the IR radiation. The sensor also typically includes a wired connection from the IR sensor head to a data processing unit or to a wireless transmitter. In the case of a temperature sensor with an IR sensor head wired to a wireless transmitter, the transmitter transmits one or more of the IR sensor head reading, ambient temperature, radio frequency (RF) signal strength, and battery condition to a host device. Although the size and portability of this type of non-contact temperature sensor is adequate for some applications, the size of the wireless transmitter and the need for a wired connection between the IR sensor head and the transmitter substantially limit its versatility.

What is needed, therefore, is a non-contact infrared temperature sensor with increased miniaturization that is capable of broadcasting temperature data without a separate wired transmitter. A diagnostic system that includes a display device that wirelessly communicates with the non-contact infrared temperature sensor to display real-time temperature data is also desirable.

SUMMARY

An infrared (IR) temperature sensor in one embodiment includes a body defining an aperture that opens to an exterior mounting surface of the body, a detector element configured to detect IR radiation emitted from an object and generate a sensor signal indicative of the detected IR radiation, the detector element supported within the body and aligned with the aperture, a wireless communication element supported within the body, a memory supported within the body and configured to store command instructions, and a processor supported within the body and operably connected to the detector element, wireless communication element, and memory, and configured to execute the stored program instructions to obtain the sensor signal, generate an output signal associated with the obtained sensor signal, and control the wireless communication element to transmit the output signal.

In some embodiments, the exterior mounting surface is configured to releasably attach to the object, the exterior mounting surface is configured to releasably attach to the object via one or more of (i) an adhesive that bonds the exterior mounting surface to the object, (ii) impregnation of the exterior mounting surface with a magnetic material that is attracted to the object, and (iii) a structure that engages a complimentary structure on the object, the aperture extends along a linear axis through the body and the exterior mounting surface is a planar mounting surface arranged perpendicular to the axis, the body is a double-walled body that defines an insulated space between an inner wall and an outer wall, the detector element, wireless communication element, memory, and processor supported within the inner wall, the wireless communication element transmits the output signal via one or more of Bluetooth and Bluetooth Low Energy (BLE), and the detector element has a circular detection surface that receives the emitted IR radiation, the detection surface having a diameter that is less than or equal to 5 mm.

A diagnostic system in one embodiment includes a first IR temperature sensor that includes a first body defining a first aperture that opens to a first exterior mounting surface of the first body, a first detector element configured to detect IR radiation emitted from a first surface and generate a first sensor signal indicative of the detected IR radiation, the first detector element supported within the first body and aligned with the first aperture, a first wireless communication element supported within the first body, a first memory supported within the first body and configured to store command instructions, a first processor supported within the first body and operably connected to the first detector element, first wireless communication element, and first memory, and configured to execute the stored program instructions to obtain the first sensor signal, generate a first output signal associated with the obtained first sensor signal, and control the first wireless communication element to transmit the first output signal, and a handheld display device that includes a display unit, a receiver, a memory configured to store command instructions, a processor operably connected to the display unit, receiver, and memory, and configured to execute the command instructions to establish an association with the first IR temperature sensor, receive first signals from the first IR temperature sensor with the receiver, the first signals including the transmitted first output signal, and interpret the first output signal and display a temperature of the first surface on the display unit.

In some embodiments, the diagnostic system includes a second IR temperature sensor that includes a second body defining a second aperture that opens to a second exterior mounting surface of the second body, a second detector element configured to detect IR radiation emitted from a second surface and generate a second sensor signal indicative of the detected IR radiation, the second detector element supported within the second body and aligned with the second aperture, a second wireless communication element supported within the second body, a second memory supported within the second body and configured to store command instructions, a second processor supported within the second body and operably connected to the second detector element, second wireless communication element, and second memory, and configured to obtain the second sensor signal, generate a second output signal associated with the obtained second sensor signal, and control the second wireless communication element to transmit the second output signal, the processor of the handheld display device is further configured to execute the command instructions to establish an association with the second IR temperature sensor, receive second signals from the second IR temperature sensor with the receiver, the second signals including the transmitted second output signal, and interpret the second output signal and display a temperature of the second surface on the display unit.

In some embodiments, the handheld display device displays the temperature of the first surface in real-time as the first signals are received from the first IR temperature sensor, the handheld display device displays the temperatures of the first and second surfaces simultaneously in real-time as the first and second signals are received from the first and second IR temperature sensors, respectively, and the first surface corresponds to a first object and the second surface corresponds to a second object spaced from the first object.

A method of forming an IR temperature sensor in one embodiment includes defining an aperture of a body that opens to an exterior mounting surface of the body, aligning a detector element with the aperture, the detector element configured to detect IR radiation emitted from an object and generate a sensor signal indicative of the detected IR radiation, supporting the aligned detector element within the body, supporting a wireless communication element within the body, supporting a memory configured to store command instructions within the body, storing the command instructions in the memory, supporting the processor within the body, and operably connecting the processor to the detector element, wireless communication element, and memory, such that the processor is configured to execute the stored program instructions to obtain the sensor signal, generate an output signal associated with the obtained sensor signal, and control the wireless communication element to transmit the output signal.

In some embodiments, supporting the aligned detector element within the body includes arranging the detector element at one end of the aperture such that the detector element is spaced from the exterior mounting surface and the object, aligning a detector element with the aperture includes arranging a detection surface of the detector element normal to an axis along which the aperture extends through the body, the detection surface configured to receive the emitted IR radiation, the exterior mounting surface is a planar mounting surface arranged normal to the axis, the exterior mounting surface is releasably attachable to the object via one or more of (i) an adhesive that bonds the exterior mounting surface to the object, (ii) impregnation of the exterior mounting surface with a magnetic material that is attracted to the object, and (iii) and a structure that engages a complimentary structure on the object.

In some embodiments, operably connecting the processor to the detector element, wireless communication element, and memory includes supporting a printed circuit board (PCB) within the body, and attaching one or more of the detector element, wireless communication element, memory, and processor to the PCB, the processor is further configured to execute the stored program instructions to control the wireless communication element to transmit the output signal via one or more of Bluetooth and Bluetooth Low Energy (BLE), and defining an aperture of a body includes defining an aperture of a double-walled body, the double-walled body defining an insulated space between an inner wall and an outer wall, the aligned detector element, wireless communication element, memory, and processor supported within the inner wall of the body.

DESCRIPTION

Figure 1:
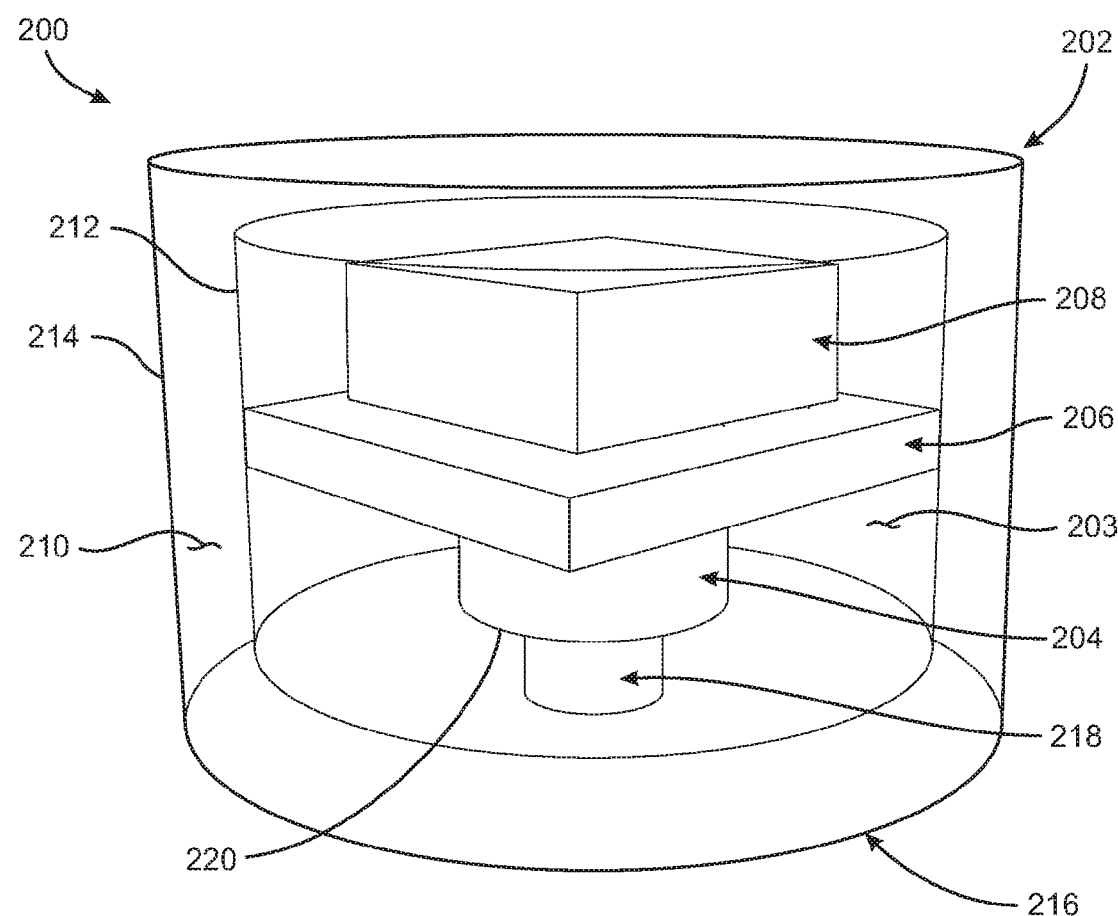
FIG. 1 is a schematic view of a wireless non-contact temperature sensor according to the principles of the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

FIG. 1 depicts an embodiment of a wireless non-contact temperature sensor 200 for use in a variety of temperature sensing environments. The temperature sensor 200 includes a body 202 with an internal volume 203 that encloses a non-contact infrared (IR) sensor 204, a printed circuit board (PCB) 206, and a processing and communications component 208. In some embodiments, such as the embodiment shown in FIG. 1, the body 202 is a double-walled body that forms an insulated space 210 between an inner wall 212 and an outer wall 214 of the body 202. The insulated space 210 insulates the internal volume 203 from sudden temperature changes in the sensing environment. The body 202 in other embodiments includes only a single wall, such as the outer wall 214, which defines the internal volume 203.

The body 202 of the temperature sensor 200 has a mounting surface 216 at one end that enables the temperature sensor 200 to be affixed to an object for measuring a temperature of the object. In the embodiment of FIG. 1, an adhesive is applied to the mounting surface 216 for temporary attachment of the temperature sensor 200 to the object. The mounting surface 216 in other embodiments is affixed to the object in any known manner that provides a temporary but secure attachment of the temperature sensor 200 to the object. For instance, in some embodiments, the mounting surface 216 is impregnated with a magnetic material that enables the sensor to be affixed to a metal object. The mounting surface 216 in other embodiments includes a structure that engages a complimentary structure on the surface of the object for temporary mechanical fastening of the temperature sensor 200 to the object.

The body 202 defines an aperture 218 opening to the mounting surface 216 at one end and to a detection surface 220 of the IR sensor 204 at the other end. The aperture 218 is sized to allow the detection surface 220 to receive sufficient IR radiation from the object for the generation of reliable real-time temperature data by the IR sensor 204. The aperture 218 in some embodiments is also sized to prevent debris or other contamination from becoming lodged in the aperture 218 and reducing the exposure of IR radiation on the detection surface 220. The IR sensor 204 in the embodiment shown is any IR sensor that detects IR radiation emitted from an object and generates temperature data in the form of an electrical signal proportional to the detected IR radiation. The electrical signal is then amplified and transformed into an output signal proportional to the temperature of the object. The IR sensor 204 in some embodiments is a miniature IR sensor with a detection surface that is approximately 5 mm in diameter. In other embodiments, the IR sensor 204 is a microelectromechanical (MEMS) IR sensor with a detection surface that is substantially smaller than 5 mm in diameter. The IR sensor 204 is capable of detecting temperatures in the range from −20 to 550 degrees Celsius. The IR sensor 204 is operatively connected to the PCB 206 for communication of the temperature data to the processing and communications component 208.

Figure 2:
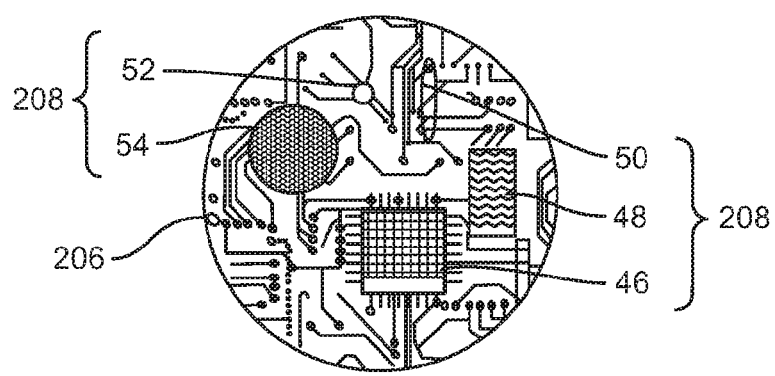
FIG. 2 depicts a detail view of a printed circuit board of the temperature sensor of FIG. 1 including a processing and communications component.

Referring now to FIG. 2, the processing and communications component 208 is shown operatively connected to the PCB 206. The processing and communications component 208 includes a processing device 46 for effecting all of the relevant processing logic. In various embodiments, the processing device 46 is a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions stored in a memory.

The processing and communications component 208 also includes a wireless communication component 48 that effects all related wireless functionality (e.g. sending and receiving signals/data etc.). In some embodiments, the wireless functionality includes one or more of Bluetooth and Bluetooth Low Energy (BLE) communication abilities. BLE is a feature of Bluetooth 4.0 wireless radio technology, which is aimed at low-power and low-latency applications for wireless devices within a short range (up to 50 meters/160 feet). This functionality facilitates a wide range of applications and smaller form factor devices, such as the temperature sensor 200. In other embodiments, the wireless communication component 48 is capable of effecting other types of wireless communication (all well known in the art) in addition to, or in place of, Bluetooth communication.

One important difference between BLE and Classic Bluetooth is that BLE uses only 40 channels, 2 MHz wide, while Classic Bluetooth uses 79 channels, 1 MHz wide. Three of these channels, which are located exactly between the wireless LAN channels, are used for device discovery and connection setup. These channels (also known as "advertising" channels) are used by the technology to search for other devices or promote its own presence to devices looking to make a connection. In comparison, Classic Bluetooth technology uses 32 channels for the same task. This drastic reduction is another feature that BLE uses to minimize time on air, so as to reduce power consumption. BLE has to switch "on" for just 0.6 to 1.2 ms to scan for other devices using its three advertising channels. Classic Bluetooth, instead, requires 22.5 ms to scan its 32 channels. The power savings are significant: BLE consumes 10 to 20 times less power than Classic Bluetooth technology to locate other radios.

The processing and communications component 208 in some embodiments also includes an LED 50 (or other illumination device) and an audio component 52. The LED 50 emits a visual alert (such as emitting a solid light or flashing alert) in accordance with relevant or corresponding instructions. In some embodiments, the body 202 has a transparent section (not shown) through which light from the LED 50 is visible to a user. The audio component 52 enables the temperature sensor 200 to emit an audible sound such as a buzzer. Both the illumination function and sound function enhance the user's ability verify the operation of the temperature sensor 200, such as verifying if the temperature sensor 200 has wirelessly paired to an external device.

The processing and communications component 208 also includes a battery 54, such as a watch battery or button cell, which is replaceably attached to the PCB 206. The longevity of the battery life is dependent on a myriad of factors such as environmental factors, use, exact battery type, manufacture and many more. It is to be understood that the depicted size and shape of the battery 54 are merely exemplary and in no way limiting. Furthermore, the location, shape, size, etc. of any of the aforementioned components on the PCB 206 are merely exemplary or representative of the named components and not intended to be limiting. It is also to be understood that the PCB 206 includes additional elements and/or variations of the named components and/or combinations of the represented components. Therefore, the depicted components are merely representative of components capable of fulfilling the described functions.

The operative connections among the IR sensor 204, the PCB 206, and the processing and communications component 208 enable the wireless non-contact temperature sensor 200 to detect the temperature of an object and to wirelessly broadcast the temperature data to an external device.

Figure 3:
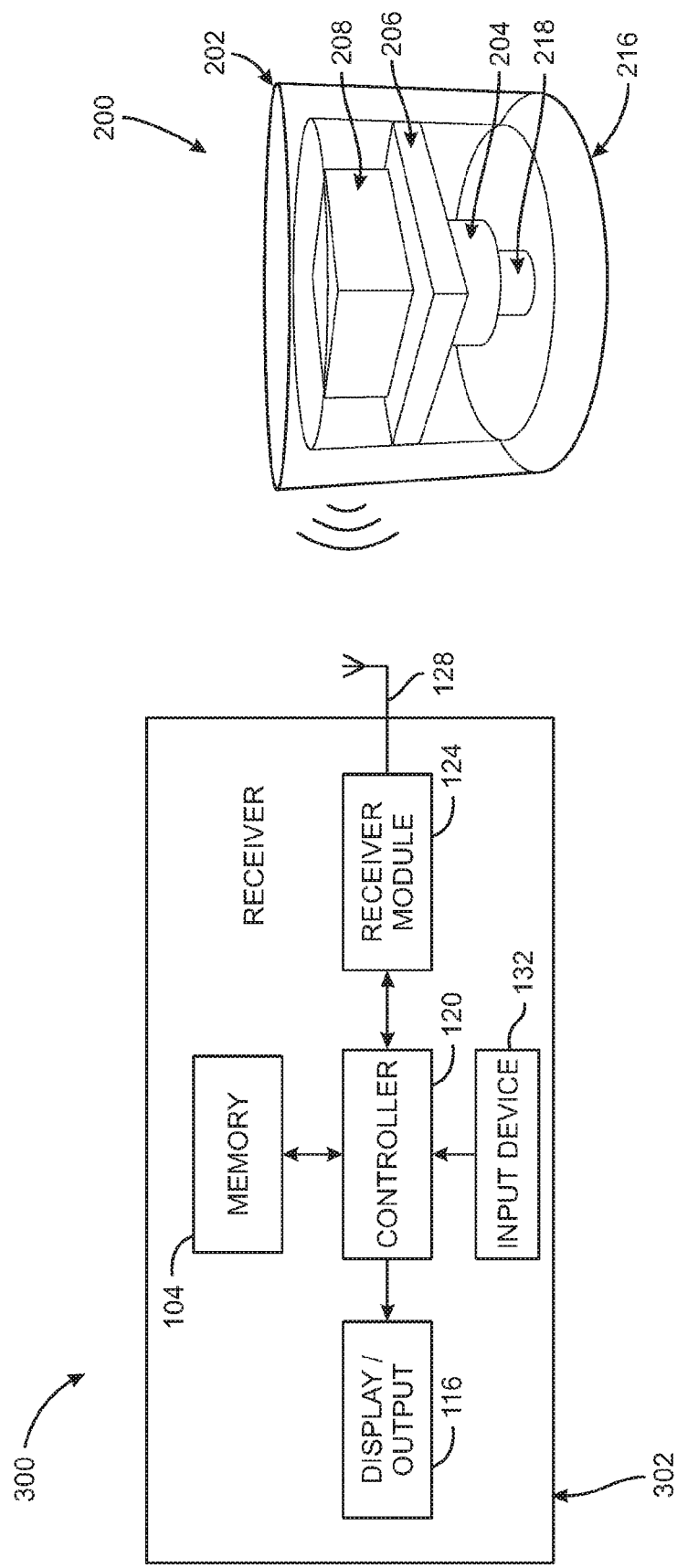
FIG. 3 is a partial block diagram of a diagnostic system including the temperature sensor of FIG. 1 and a display device that is configured to display temperature data broadcasted by the temperature sensor.

FIG. 3 shows a partial block diagram of a diagnostic system 300 including the wireless non-contact temperature sensor 200 of FIG. 1 and a display device 302 that is configured to wirelessly communicate with the temperature sensor 200. The display device 302 includes a memory 104, display or output unit 116, controller 120, receiver module 124, antenna 128, and input device 132. The memory 104 is configured to store program instructions for operation of the display device 302. Various embodiments of the memory 104 include static and dynamic random access memory (RAM), non-volatile memory including NAND and NOR flash, magnetic data storage devices, and any data storage device that can store and retrieve digital data.

The receiver module 124 is configured to receive signals that are broadcast by the temperature sensor 200. The receiver module 124 is connected to an antenna 128 that is configured to receive the signals broadcast by the temperature sensor 200. The signals include encoded data that the receiver module 124 can decode into a form that is suitable for use with the controller 120, and the receiver module 124 is communicatively coupled to the controller 120. In some embodiments, some or all of the operations of the receiver module 124 are implemented in software in the controller 120.

The display or output unit 116 is operatively connected to the controller 120. The display unit 116 is configured to display real-time temperatures from the temperature data that the display device 302 receives from the temperature sensor 200. For instance, in one embodiment, the display unit 116 is a visual display panel such as a liquid crystal display (LCD) that displays real-time temperatures corresponding to the temperature data received from the temperature sensor 200. Although only one temperature sensor 200 is shown in FIG. 2, the diagnostic system 300 in some embodiments includes two or more temperature sensors 200 configured to detect separately the temperature of one or more objects. The display device 302 in this embodiment is configured to receive respective temperature data from the two or more temperature sensors 200 and to simultaneously display the real-time temperatures of the one or more objects on the display unit 116.

The controller 120 is an electronic processing device such as a microcontroller, application specific integrated circuit (ASIC), field programmable gate array (FPGA), microprocessor including microprocessors from the x86 and ARM families, or any electronic device that is configured with programmed instructions and electronic components to perform the functions of the display device 302 disclosed herein. In some embodiments, the controller 120 is implemented in a system on a chip (SoC) configuration where the controller 120 and one or more of the memory 104, receiver module 124, and controls for the display device 116 are integrated into a single device.

The controller 120 is operatively connected to the memory 104 to enable the controller 120 to store data into the memory 104 and load data from the memory 104 for processing. During operation, the controller 120 loads program data stored in the memory 104. The stored program data 114 include instructions that the controller 120 executes during operation of the display device 302. An input device 132 is operatively connected to the controller 120 to enable the controller 120 to switch between two or more operating modes or to adjust the operation of the display device 302. Various input device embodiments include one or more switches or buttons, alphanumeric key inputs, and a touch-screen input that can be integrated with the display unit 116.

A method of forming an IR temperature sensor 200 is now described with reference to FIG. 1. The method includes defining an aperture 218 in a body 202 of the IR temperature sensor 200. The aperture 218 opens from a mounting surface 216 of the body 202 to an internal volume 203 defined by the body 202. The method further includes supporting a detector element 204, a wireless communication component (FIG. 2 at 48), a memory (FIG. 2 at 46), and a processor (FIG. 2 at 46) within the volume 203 of the body 202. In some embodiments, the detector element 204 is aligned with the aperture 218 such that a detection surface 220 of the detector element 204 is arranged normal to an axis along which the aperture 218 extends through the body 202. The detector element 204 is configured to detect IR radiation emitted from an object and generate a sensor signal indicative of the detected IR radiation. In some embodiments, the detector element 204 is supported within the body 202 by arranging the detector element 204 at one end of the aperture 218 such that the detector element 204 is spaced from the mounting surface 216 and the object.

The method further includes operably connecting the processor 46 to the detector element 204, wireless communication component 48, and memory 46. The processor 46 in some embodiments is operably connected to one or more of the detector element 204, wireless communication component 48, and memory 46 via a printed circuit board (PCB) supported within the body 202. The processor 46 executes program instructions stored in the memory 46 to obtain the sensor signal, generate an output signal associated with the obtained sensor signal, and control the wireless communication element 48 to transmit the output signal. The processor 46 in some embodiments is further configured to execute the program instructions stored in the memory 46 to control the wireless communication component 48 to transmit the output signal via one or more of Bluetooth and Bluetooth Low Energy (BLE).

Figure 4:
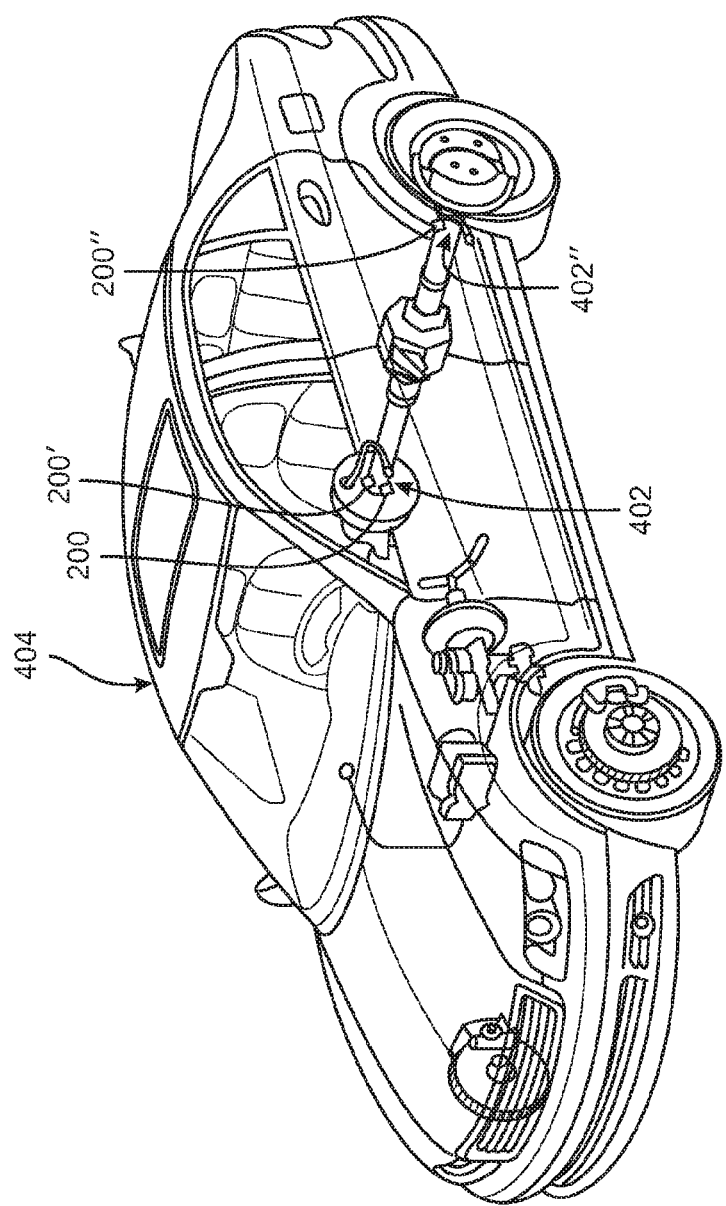
FIG. 4 illustrates the diagnostic system of FIG. 3 implemented in an automotive application to monitor the temperature of wheel bearings in an automobile.
Figure 4:
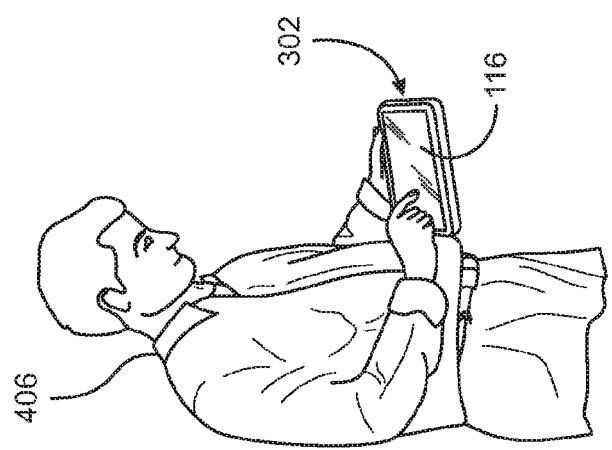

A method of using the diagnostic system of FIG. 3 to monitor the temperature of wheel bearings in an automotive application is discussed with reference to FIG. 4 and FIG. 5.

A technician 406 mounts at least one wireless non-contact temperature sensor, such as the temperature sensor 200 of FIG. 1, near a wheel bearing 402 of a vehicle 404. The temperature sensor 200 is mounted so that the aperture 218 opening to the IR sensor 204 faces the surface portion to be monitored. In the embodiment of FIG. 4, two temperature sensors 200 and 200' are mounted near the passenger side rear wheel bearings 402 of the vehicle 404 and one temperature sensor 200" is mounted near the driver side rear wheel bearings 402".

Figure 5:
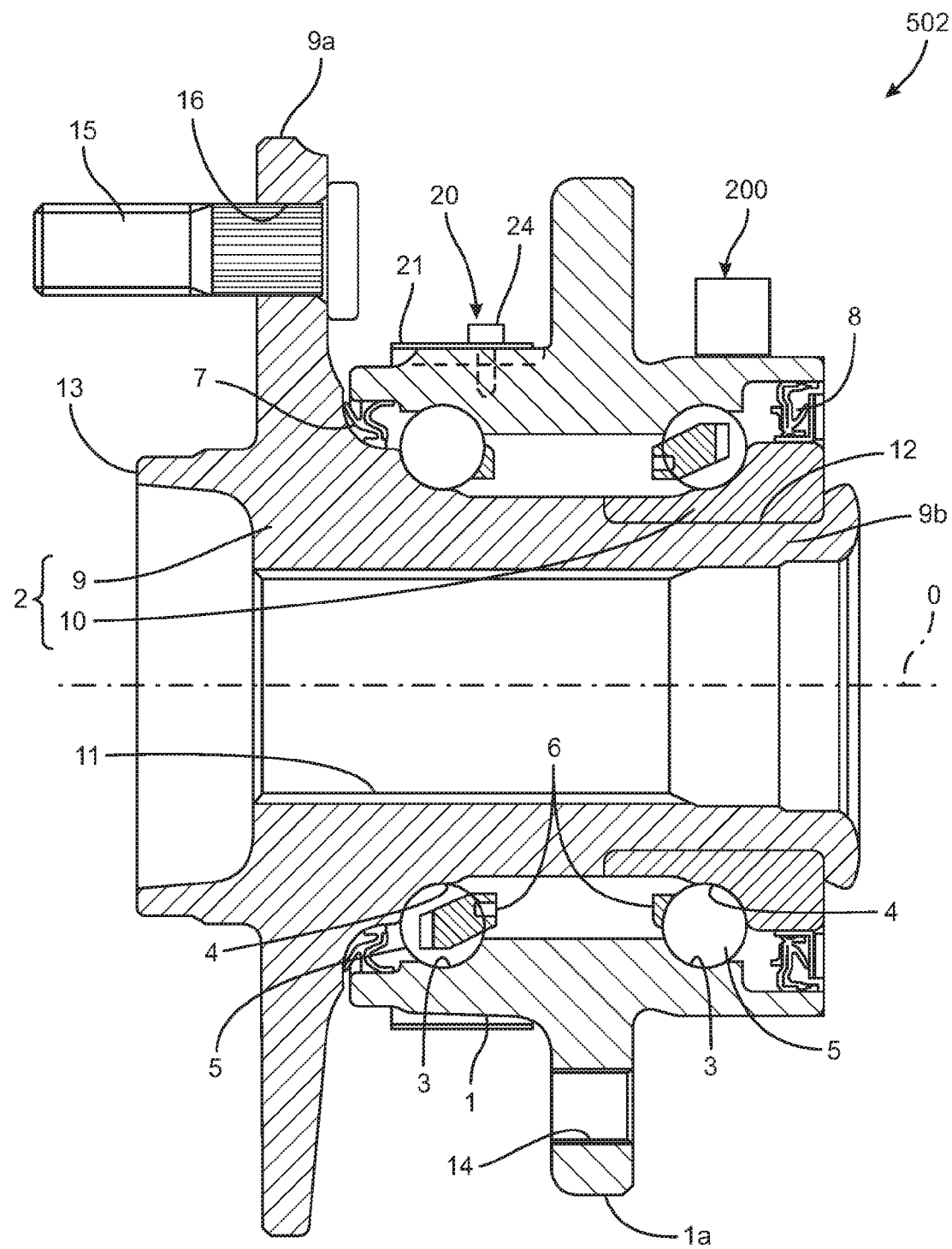
FIG. 5 is a cross-sectional view of a wheel hub assembly showing the temperature sensor of FIG. 1 mounted on the wheel hub assembly to sense the temperature of the wheel bearings.

FIG. 5 depicts a wheel hub assembly 502 illustrating the wireless non-contact temperature sensor 200 mounted near the wheel bearings of the vehicle. The wheel hub assembly 502 of FIG. 5 includes an outer member 1 having an inner periphery formed with a plurality of raceway surfaces 3, an inner member 2 having an outer periphery formed with a plurality of raceway surfaces 4 opposed to the raceway surfaces 3 of the outer member 1, and a plurality of rows of rolling elements 5 interposed between the raceway surfaces 3 of the outer member 1 and the raceway surfaces 4 of the inner member 2. The rolling elements 5 are in the form of balls with each row of the balls retained by a retainer 6. A pair of seal units 7 and 8 seal respective opposite ends of a bearing space defined between the outer member 1 and the inner member 2.

The inner member 2 serves as a rotational member and includes a hub unit 9 and an inner ring 10. The hub unit 9 includes a hub flange 9a that mounts to a wheel and also includes an axle portion 9b. The inner ring 10 is mounted onto an outer periphery of the axle portion 9b at an inboard end of the axle portion 9b. The hub unit 9 and the inner ring 10 are formed with the respective rows of the raceway surfaces 4. The hub flange 9a has a plurality of circumferential locations formed with respective holes 16 for force-fitting hub bolts 15. The hub unit 9 also includes a cylindrical pilot portion 13 protruding towards an outboard direction from a root of the hub flange 9a. The pilot portion 13 guides a wheel (not shown) and brake components (not shown).

The outer member 1 serves as a stationary member and is of one-piece construction that includes a flange 1a on an outer periphery thereof. The flange 1a attaches to a knuckle (not shown) of a suspension system associated with a vehicle body, to mount to the vehicle body. The flange 1a has a plurality of circumferential locations formed therein with respective bolt holes 14 for attachment to the knuckle. In the embodiment of FIG. 5, the wireless non-contact temperature sensor 200 is mounted directly on the outer periphery of the outer member 1 such that the mounting surface 216 is adjacent to the outer member 1 and the aperture 218 faces the rolling elements 5. In other embodiments, the temperature sensor 200 is mounted to other stationary features of the wheel hub assembly 502 or surrounding vehicle structure such that the mounting surface 216 is spaced from the outer member 1, but the aperture 220 still faces the rolling elements 5. In yet further embodiments, two or more wireless non-contact temperature sensors are mounted near the outer periphery of the outer member 1.

Referring again to FIG. 4, once the temperature sensors 200, 200', and 200" are mounted near the wheel bearings 402 and 402", the technician pairs the temperature sensors with the display device 302 so that temperature data generated by the temperature sensors is displayed simultaneously and in real-time on the display unit 116 of the display device 302. Although the display device 302 of FIG. 4 is in the form of a tablet, the display device in other embodiments can be any wireless and/or Bluetooth compatible display device, such as a smartphone, personal computer, or similar device that is capable of wireless connection to the temperature sensors. To diagnose temperature anomalies in the wheel bearings 402 and 402", the technician 406 operates the vehicle 404 to rotate the wheels supported by the monitored wheel bearings 402 and 402". In some embodiments, such vehicle operation includes a road test in which the technician drives the car on the open road or on a closed course. In other embodiments, such operation includes a simulated road test in which the car remains stationary on a test platform and the wheels are positioned to drive rollers that simulate the load conditions of an actual road test.

The technician 406 monitors the real-time temperatures of the wheel bearings 402 and 402" during the entire road test to verify that the wheel bearings present no temperature anomalies. Once the diagnostic test is complete, the technician 406 operates the display device 302 to save the respective temperature data from the temperature sensors 200, 200' and 200" for further processing, if needed. The display device 302 is then un-paired from the temperature sensors and the temperature sensors are removed from the vehicle 404.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An infrared (IR) temperature sensor, comprising:
    a body defining an aperture that opens to an exterior mounting surface of the body;
    a detector element configured to detect IR radiation emitted from an object and generate a sensor signal indicative of the detected IR radiation, the detector element supported within the body and aligned with the aperture;
    a wireless communication element supported within the body;
    a memory supported within the body and configured to store command instructions; and
    a processor supported within the body and operably connected to the detector element, wireless communication element, and memory, and configured to execute the stored program instructions to:
        obtain the sensor signal,
        generate an output signal associated with the obtained sensor signal, and
        control the wireless communication element to transmit the output signal,
    wherein the exterior mounting surface is configured to releasably attach to the object from which the IR radiation is emitted.

2. The IR temperature sensor of claim 1, wherein the exterior mounting surface is configured to releasably attach to the object via one or more of (i) an adhesive that bonds the exterior mounting surface to the object, (ii) impregnation of the exterior mounting surface with a magnetic material that is attracted to the object, and (iii) a structure on the exterior mounting surface that engages a complimentary structure on the object.

3. The IR temperature sensor of claim 1, wherein the aperture extends along a linear axis through the body and the exterior mounting surface is a planar mounting surface arranged perpendicular to the axis.

4. The IR temperature sensor of claim 1, wherein the body is a double-walled body that defines an insulated space between an inner wall and an outer wall, the detector element, wireless communication element, memory, and processor supported within the inner wall.

5. The IR temperature sensor of claim 1, wherein the wireless communication element transmits the output signal via one or more of Bluetooth and Bluetooth Low Energy (BLE).

6. The IR temperature sensor of claim 1, wherein the detector element has a circular detection surface that receives the emitted IR radiation, the detection surface having a diameter that is less than or equal to 5 mm.

7. A diagnostic system, comprising:
    a first infrared (IR) temperature sensor, including:
        a first body defining a first aperture that opens to a first exterior mounting surface of the first body,
        a first detector element configured to detect IR radiation emitted from a first surface and generate a first sensor signal indicative of the detected IR radiation, the first detector element supported within the first body and aligned with the first aperture,
        a first wireless communication element supported within the first body,
        a first memory supported within the first body and configured to store command instructions,
        a first processor supported within the first body and operably connected to the first detector element, first wireless communication element, and first memory, and configured to execute the stored program instructions to:
            obtain the first sensor signal,
            generate a first output signal associated with the obtained first sensor signal, and
            control the first wireless communication element to transmit the first output signal,
        wherein the first exterior mounting surface is configured to releasably attach to the first surface from which the IR radiation is emitted; and
    a handheld display device, including:
        a display unit,
        a receiver,
        a memory configured to store command instructions,
        a processor operably connected to the display unit, receiver, and memory, and configured to execute the command instructions to:
            establish an association with the first IR temperature sensor,
            receive first signals from the first IR temperature sensor with the receiver, the first signals including the transmitted first output signal, and
            interpret the first output signal and display a temperature of the first surface on the display unit.

8. The diagnostic system of claim 7, further comprising:
    a second IR temperature sensor, including:
        a second body defining a second aperture that opens to a second exterior mounting surface of the second body,
        a second detector element configured to detect IR radiation emitted from a second surface and generate a second sensor signal indicative of the detected IR radiation, the second detector element supported within the second body and aligned with the second aperture,
        a second wireless communication element supported within the second body, a second memory supported within the second body and configured to store command instructions, a second processor supported within the second body and operably connected to the second detector element, second wireless communication element, and second memory, and configured to:
  obtain the second sensor signal,
  generate a second output signal associated with the obtained second sensor signal, and
  control the second wireless communication element to transmit the second output signal
wherein the second exterior mounting surface is configured to releasably attach to the second surface from which the IR radiation is emitted,
wherein the processor of the handheld display device is further configured to execute the command instructions to:
  establish an association with the second IR temperature sensor,
  receive second signals from the second IR temperature sensor with the receiver, the second signals including the transmitted second output signal, and
  interpret the second output signal and display a temperature of the second surface on the display unit.

9. The diagnostic system of claim 7, wherein the handheld display device displays the temperature of the first surface in real-time as the first signals are received from the first IR temperature sensor.

10. The diagnostic system of claim 8, wherein the handheld display device displays the temperatures of the first and second surfaces simultaneously in real-time as the first and second signals are received from the first and second IR temperature sensors, respectively.

11. The diagnostic system of claim 8, wherein the first surface corresponds to a first object and the second surface corresponds to a second object spaced from the first object.

12. A method of forming an infrared (IR) temperature sensor, comprising:
  defining an aperture of a body that opens to an exterior mounting surface of the body;
  aligning a detector element with the aperture, the detector element configured to detect IR radiation emitted from an object and generate a sensor signal indicative of the detected IR radiation;
  forming the body such that the exterior mounting surface is releasably attachable to the object from which the IR radiation is emitted;
  supporting the aligned detector element within the body;
  supporting a wireless communication element within the body;
  supporting a memory configured to store command instructions within the body;
  storing the command instructions in the memory;
  supporting the processor within the body; and
  operably connecting the processor to the detector element, wireless communication element, and memory, such that the processor is configured to execute the stored program instructions to:
    obtain the sensor signal,
    generate an output signal associated with the obtained sensor signal, and
    control the wireless communication element to transmit the output signal.

13. The method of claim 12, wherein supporting the aligned detector element within the body comprises:
  arranging the detector element at one end of the aperture such that the detector element is spaced from the exterior mounting surface and the object.

14. The method of claim 12, wherein aligning a detector element with the aperture comprises:
  arranging a detection surface of the detector element normal to an axis along which the aperture extends through the body, the detection surface configured to receive the emitted IR radiation.

15. The method of claim 14, wherein the exterior mounting surface is a planar mounting surface arranged normal to the axis.

16. The method of claim 12, wherein the exterior mounting surface is releasably attachable to the object via one or more of (i) an adhesive that bonds the exterior mounting surface to the object, (ii) impregnation of the exterior mounting surface with a magnetic material that is attracted to the object, and (iii) and a structure on the exterior mounting surface that engages a complimentary structure on the object.

17. The method of claim 12, wherein operably connecting the processor to the detector element, wireless communication element, and memory comprises:
  supporting a printed circuit board (PCB) within the body; and
  attaching one or more of the detector element, wireless communication element, memory, and processor to the PCB.

18. The method of claim 12, wherein the processor is further configured to execute the stored program instructions to control the wireless communication element to transmit the output signal via one or more of Bluetooth and Bluetooth Low Energy (BLE).

19. The method of claim 12, wherein defining an aperture of a body comprises:
  defining an aperture of a double-walled body, the double-walled body defining an insulated space between an inner wall and an outer wall, the aligned detector element, wireless communication element, memory, and processor supported within the inner wall of the body.

* * * * *